US011569707B2

(12) United States Patent
Sibbach et al.

(10) Patent No.: US 11,569,707 B2
(45) Date of Patent: Jan. 31, 2023

(54) APPARATUS AND METHOD FOR COOLING AN ELECTRICAL MACHINE

(71) Applicant: GE Aviation Systems LLC, Grand Rapids, MI (US)

(72) Inventors: Arthur William Sibbach, Boxford, MA (US); Hao Huang, Troy, OH (US)

(73) Assignee: GE Aviation Systems LLC, Grand Rapids, MI (US)

( * ) Notice: Subject to any disclaimer, the term of this patent is extended or adjusted under 35 U.S.C. 154(b) by 142 days.

(21) Appl. No.: 16/936,711

(22) Filed: Jul. 23, 2020

(65) Prior Publication Data

US 2022/0029500 A1 Jan. 27, 2022

(51) Int. Cl.
*H02K 5/20* (2006.01)
*H02K 9/19* (2006.01)
*H02K 15/14* (2006.01)

(52) U.S. Cl.
CPC .............. *H02K 5/20* (2013.01); *H02K 15/14* (2013.01)

(58) Field of Classification Search
CPC .................................. H02K 5/20; H02K 9/19
USPC .......................................... 310/52–54, 58–59
See application file for complete search history.

(56) References Cited

U.S. PATENT DOCUMENTS

| 3,441,758 | A | 4/1969 | Albright et al. |
| 5,519,269 | A | 5/1996 | Lindberg |
| 6,222,289 | B1 * | 4/2001 | Adames .............. H02K 5/203 310/58 |
| 9,419,502 | B2 | 8/2016 | Veronesi et al. |
| 9,935,519 | B2 | 4/2018 | Büttner et al. |
| 10,097,066 | B2 | 10/2018 | Hanumalagutti et al. |
| 10,186,927 | B2 | 1/2019 | Randria et al. |
| 10,224,785 | B2 | 3/2019 | Weis et al. |
| 10,270,315 | B2 | 4/2019 | Desbiens et al. |
| 10,424,989 | B2 | 9/2019 | Huang et al. |
| 10,476,358 | B2 | 11/2019 | Huang et al. |
| 2005/0151431 | A1 * | 7/2005 | Cronin ................ H02K 5/20 310/58 |
| 2008/0185924 | A1 | 8/2008 | Masoudipour et al. |
| 2014/0246933 | A1 | 9/2014 | Chamberlin |
| 2015/0229186 | A1 | 8/2015 | Sauer |
| 2018/0205285 | A1 | 7/2018 | Huang et al. |
| 2018/0287463 | A1 | 10/2018 | Kawashima et al. |
| 2018/0342922 | A1 | 11/2018 | My Razak et al. |
| 2019/0074750 | A1 | 3/2019 | Sangli et al. |

FOREIGN PATENT DOCUMENTS

| CN | 1077345 | C | 1/2002 | |
| CN | 101764454 | B | 5/2012 | |
| CN | 110350744 | A * | 10/2019 | |
| WO | WO-2018235969 | A1 * | 12/2018 | ............. H02K 1/145 |

\* cited by examiner

*Primary Examiner* — Jose A Gonzalez Quinones
(74) *Attorney, Agent, or Firm* — McGarry Bair PC

(57) ABSTRACT

An enclosure for an electric machine includes a housing defining an axial bore having an opening at a first end of the bore. The housing comprises a first wall having a first inboard surface partially defining the bore, and a first outboard surface spaced from the first inboard surface, the first wall defining a first coolant channel disposed between the first inboard and first outboard surface. An end cap is fastenable to the housing to cover the opening.

11 Claims, 9 Drawing Sheets

APPARATUS AND METHOD FOR COOLING AN ELECTRICAL MACHINE

TECHNICAL FIELD

The disclosure relates to a method and apparatus for cooling an electric machine, and more specifically to a housing therefor.

BACKGROUND

Electrical machinery, such as generators, motors, motor/generators, starter/generators, and other dynamoelectric machinery are well known and can be used for a variety of purposes. For example, generators can provide for the generation of electricity from a mechanical force.

An electrical machine can include a stator and a rotor. The rotor can be rotated relative to the stator to generate electrical energy or can be rotated relative to the stator because of changing magnetic fields induced in windings of the stator. The interaction of the rotating magnetic field in relation to the conductive windings generates a current in the stator windings, which can be provided to the power output of the generator, where it can be further transmitted to power an electrical load.

Typically, such rotatable electric machines are generally cylindrical, with the rotor and stator assemblies concentrically arranged within a cylindrical enclosure. The rotor can include a rotatable shaft that protrudes from at least one end of the enclosure. The housing typically comprises at least two elements: a cylindrical housing portion or "shell" defining a cavity to receive the rotor and stator concentrically therein through an opening at the end of the cavity, and a cover, or "end cap" fastened to an end of the cylindrical housing portion to cover the opening and enclose the rotor and stator. Most electric machines also include a second end cap attached to the opposing end of the cylindrical housing to cover an opening at the opposing end of the housing. At least one of the end caps will typically define a centrally disposed aperture, sized and arranged to receive the rotor shaft therethrough. Electric motors or generators typically generate heat during operation. Consequently, an electric machine needs to be cooled to ensure efficient operation of machine. Conventional electrical machines can be liquid or air cooled

BRIEF DESCRIPTION

In one aspect, the present disclosure relates to an enclosure for an electric machine. The enclosure includes a housing defining an axial bore having an opening at a first end of the bore. The housing comprises a first wall having a first inboard surface partially defining the bore, and a first outboard surface spaced from the first inboard surface, the first wall defining a first coolant channel disposed between the first inboard and first outboard surface; and an end cap fastenable to the housing to cover the opening.

In another aspect, the present disclosure relates to a method of cooling an electric machine enclosed by a housing and an end cap. The method includes passing a fluid coolant through a first coolant channel disposed in a first wall of the housing, the first wall having a first inboard surface and a first outboard surface spaced from the first inboard surface, wherein the first coolant channel is disposed between the first inboard and first outboard surface.

In yet another aspect, the present disclosure relates to a method of manufacturing an electric machine. The method includes printing a housing defining an axial bore having an opening at a first end of the bore. The housing also including a first wall having a first inboard surface partially defining the bore, and a first outboard surface spaced from the first inboard surface, the first wall defining a first coolant channel disposed between the first inboard and first outboard surface. The method further includes printing an end cap, installing said a stator assembly and a rotor assembly within the housing bore, and fastening the end cap to the housing first end to cover the opening.

These and other features, aspects and advantages of the present disclosure will become better understood with reference to the following description and appended claims. The accompanying drawings, which are incorporated in and constitute a part of this specification, illustrate aspects of the disclosure and, together with the description, explains the principles of the disclosure.

BRIEF DESCRIPTION OF THE DRAWINGS

A full and enabling disclosure of the present description, including the best mode thereof, directed to one of ordinary skill in the art, is set forth in the specification, which refers to the appended FIGS., in which.

DETAILED DESCRIPTION

Figure 1:
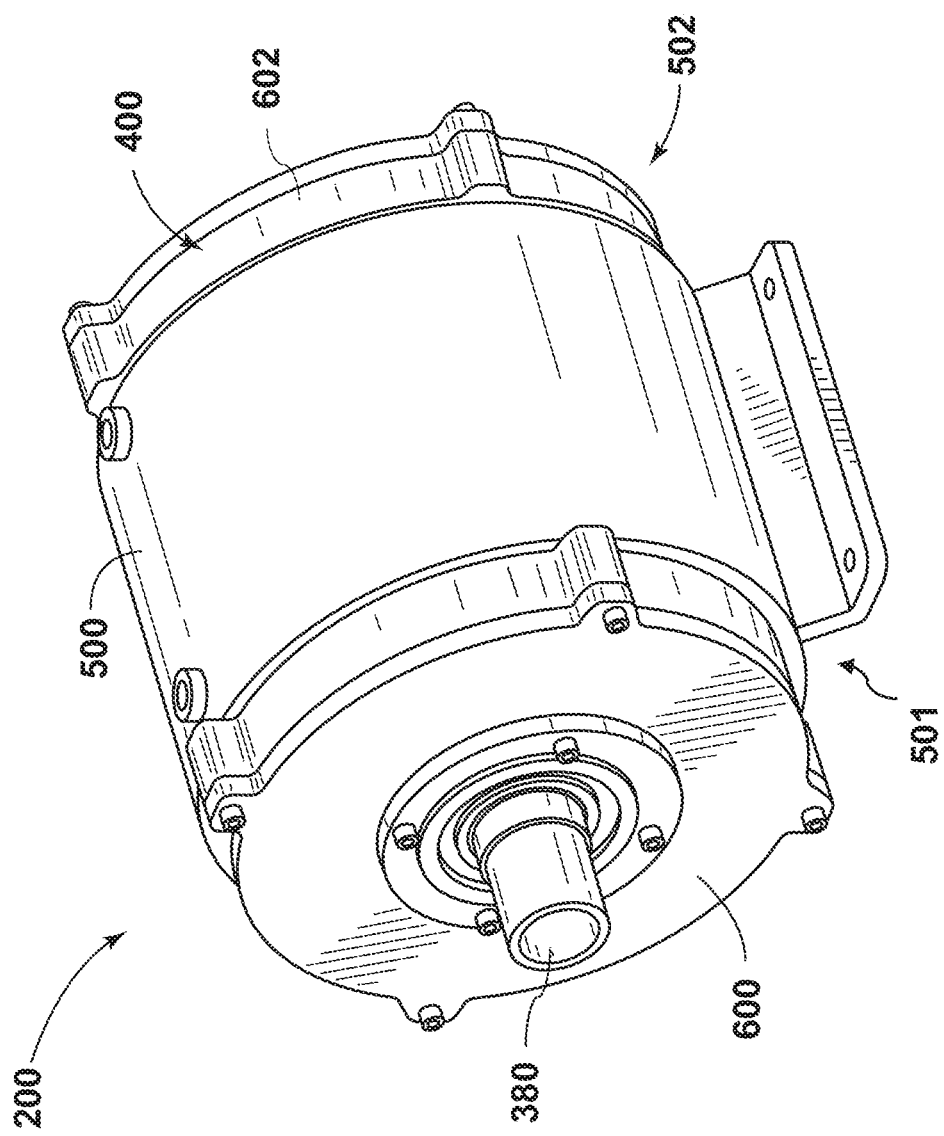
FIG. 1 illustrates an example perspective view of an electrical machine in accordance with various aspects described herein.

As used herein, the term "set" or a "set" of elements can be any number of elements, including only one. As used herein, the terms "axial" or "axially" refer to a dimension along a longitudinal axis of an electric machine or along a longitudinal axis of a component disposed within the electric machine. Additionally, as used herein, the terms "radial" or "radially" refer to a direction away from a common center. For example, in the overall context of a cylindrical motor, radial refers to a direction along a ray extending between a center longitudinal axis and an outer circumference. As used herein, the term "helix" or "helically" refer to a direction in the shape of a helix or a spiral around a center longitudinal axis. The use of the terms "proximal" or "proximally," either by themselves or in conjunction with the terms "radial" or "radially," refers to moving in a direction toward the center longitudinal axis, or a component being relatively closer to the center longitudinal axis as compared to another component.

As used herein, the terms "tangential" or "tangentially" refer to a dimension extending perpendicular to a radial line with respect to the longitudinal axis of the engine or the longitudinal axis of a component disposed therein.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

All directional references (e.g., radial, axial, upper, lower, upward, downward, left, right, lateral, front, back, top, bottom, above, below, vertical, horizontal, clockwise, counterclockwise, inboard, outboard) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other.

As used in the specification and the appended claims, the singular forms "a," "an," and "the" include plural referents unless the context clearly dictates otherwise. The use of the term "about" in conjunction with a numerical value refers to within 25% of the stated amount.

Typically, the stator of a conventional electric machine is liquid cooled due to the generally higher heat transfer coefficient of liquids compared to air. Liquid cooling of the stator typically requires a separate "cooling jacket" formed as an open-ended cylinder that is concentrically disposed between an interior surface of the housing and the stator core, to longitudinally encircle the stator core and windings. Typically, the cooling jacket enables a fluid coolant to be circulated around the motor stator housing. The fluid coolant, which can be a thermally conductive fluid such as water or a water-based fluid coolant, is typically circulated through channels defined within or around the cylindrical cooling jacket. Heat is thereby transferred to the coolant from the stator through direct contact of the stator with the cooling jacket, thereby cooling the machine.

Many conventional cooling jackets are provided as an open ended, hollow cylindrical aluminum casing longitudinally disposed around the stator core. However, some prior art cooling jackets are also formed from cast iron which adds considerable weight, limiting its applicability in aviation and aerospace applications. Further, such iron cooling jackets are prone to corrosion, which, over time degrades the heat transfer capability of the cooling jacket due to the build-up of corrosion products in the coolant.

Accordingly, it will be appreciated that there is a need for an improved method for cooling electrical machines, and a need for an improved electrical machine that eliminates a need for a separate cooling jacket and that provides a higher cooling efficiency than prior art fluid cooling methods using a cooling jacket between housing and stator, and that is lighter weight for applications in the aviation and aerospace industries.

Reference now will be made in detail to aspects, one or more examples of which are illustrated in the drawings. Each example is provided by way of explanation of the aspects, not limitation of the aspects. In fact, it will be apparent to those skilled in the art that various modifications and variations can be made in the present disclosure without departing from the scope or spirit of the disclosure. For instance, features illustrated or described as part of one aspect can be used with another aspect to yield a still further aspect. Thus, it is intended that the present disclosure covers such modifications and variations as come within the scope of the appended claims and their equivalents.

In accordance with example aspects of the present disclosure, various components can be formed or "printed" using an additive-manufacturing process, such as a three-dimensional (3-D) printing process. The use of such a process can allow the components to be formed integrally, as a single monolithic component, or as any suitable number of sub-components. The manufacturing process can allow these components to be integrally formed and include a variety of features not possible when using prior manufacturing methods.

As used herein, the terms "additively manufactured" or "additive manufacturing techniques or processes" refer generally to manufacturing processes wherein successive layers of material(s) are provided on each other to "build-up", layer-by-layer, a 3-D component. In some aspects, the successive layers generally fuse together to form a monolithic component which can have a variety of integral sub-components. Although additive manufacturing technology is described herein as providing for the fabrication of complex objects by building objects point-by-point, layer-by-layer, typically in a vertical direction, other methods of fabrication are possible and within the scope of the present disclosure. For example, although the discussion herein refers to the addition of material to form successive layers, one skilled in the art will appreciate that the methods and structures disclosed herein can be practiced with any additive manufacturing technique or manufacturing technology. For example, aspects of the present disclosure can use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3-D printing such as by inkjets and laserjets, sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Metal Laser Sintering (DMLS), and other known processes.

The additive manufacturing processes described herein can be used for forming components using any suitable material. More specifically, according to example aspects, the components described herein can be formed in part, in whole, or in some combination of materials including but not limited to pure metals, cobalt alloys, iron-cobalt vanadium alloy, nickel alloys, chrome alloys, titanium, titanium alloys, magnesium, magnesium alloys, aluminum, aluminum alloys, austenite alloys such as nickel-chromium-based superalloys, and metal ceramic composite (e.g., an aluminum SiC matrix).

One skilled in the art will appreciate that a variety of materials and methods for bonding those materials can be used and are contemplated as within the scope of the present disclosure. As used herein, references to "fusing" can refer to any suitable process for creating a bonded layer of any of the above materials. For example, if the material is powdered metal, the bond can be formed by a melting process. One skilled in the art will appreciate that other methods of fusing materials to make a component by additive manufacturing are possible, and the presently disclosed subject matter can be practiced with those methods.

In addition, the additive manufacturing process disclosed herein allows a single component to be formed from multiple materials. Thus, the components described herein can be formed from any suitable mixtures of the above materials. For example, a component can include multiple layers, segments, or parts that are formed using different materials, processes, or on different additive manufacturing machines. In this manner, components can be constructed which have different materials and material properties for meeting the demands of any application.

An example additive manufacturing or printing process will now be described. Additive manufacturing processes fabricate components using 3-D information, for example a 3-D computer model, of the component. Accordingly, a 3-D design model of the component can be defined prior to manufacturing. In this regard, a model or prototype of the component can be scanned to determine the 3-D information of the component. As another example, a model of the component can be constructed using a suitable computer aided design (CAD) program to define the 3-D design model of the component.

The design model can include 3-D numeric coordinates of the entire configuration of the component including both external and internal surfaces of the component. For example, the design model can define the body, the component base, the surface, any surface features such as irregularities or datum features, as well as internal passageways, openings, support structures, etc. In one example aspect, the 3-D design model is converted into a plurality of slices or segments, e.g., along a central (e.g., vertical) axis of the component or any other suitable axis. Each slice can define a two-dimensional (2-D) cross section of the component for a predetermined height of the slice. The plurality of successive 2-D cross-sectional slices together form the 3-D component. The component is then "built-up" slice-by-slice, or layer-by-layer, until finished.

In this manner, the components described herein can be fabricated using the additive process, or more specifically each layer is successively formed, e.g., by fusing sintering metal powder using laser energy or heat. For example, a particular type of additive manufacturing process can use an energy beam, for example, an electron beam or electromagnetic radiation such as a laser beam, to sinter or melt a powder material. Any suitable laser and laser parameters can be used, including considerations with respect to power, laser beam spot size, and scanning velocity. The build material can be formed by any suitable powder or material selected for enhanced strength, durability, and useful life, particularly at high temperatures.

Each successive layer can be, for example, between about 0.25 mil and 200 mil thick, although the thickness can be selected based on any number of parameters and can be any suitable size according to alternative aspects. Therefore, utilizing the additive formation methods described above, the components described herein can have cross sections as thin as one thickness of an associated powder layer, e.g., 10 mil, utilized during the additive formation process.

In addition, utilizing an additive process, the surface finish and features of the components can vary as needed depending on the application. For example, the surface finish can be adjusted (e.g., made smoother or rougher) by selecting appropriate laser parameters during the additive process. A rougher finish can be achieved by increasing laser scan speed or a thickness of the powder layer, and a smoother finish can be achieved by decreasing laser scan speed or the thickness of the powder layer. The scanning pattern or laser power can also be changed to change the surface finish in a selected area of the components.

Typical methods of manufacturing an electrical machine can include, for instance, manufacturing a stator or other component by stacking oxidized lamination sheets to form a core, winding coils made of insulated wire, inserting slot liners and coils into slots of the core, sliding slot wedges at the top of a slot, forming end turns, and varnishing the stator or rotor assembly. Alternatively, the stator or rotor assembly can be additively manufactured or "printed" components that are built up using conventional additive manufacturing techniques. Typically, the electrical machine is assembled by fabricating the individual parts (for example, the rotor, stator, and cooling jacket assemblies) and inserting the parts into the housing, and then the gaskets and end caps are attached.

Example aspects of the present disclosure can be additively manufactured or "printed" components of electrical machinery (e.g., rotary electrical machines) or to methods for manufacturing the same. As used herein, use of the term "printed" or "printing" refers to, for instance, manufacturing processes wherein successive layers of material(s) are provided on each other to "build-up", layer-by-layer, a 3-D component, as explained herein. Example manufacturing processes for printing metal components of an electrical machine will be discussed in detail below.

The electrical machinery can be manufactured, for instance, by printing a stator assembly, printing a rotor assembly, printing a housing and printing at least one end cap according to aspects of the present disclosure. The components can then be assembled together to form an electrical machine. Electrical machines that can be assembled according to non-limiting aspects of the present disclosure can include generators, motors, motor/generators, starter/generators, etc. In some aspects, the electrical machine can be air cooled. In some aspects, the electrical machine can be liquid cooled.

With reference to FIG. 1, non-limiting aspects of the present disclosure are directed to printing an enclosure 400 for an electrical machine 200, (for example, a motor or generator) the enclosure 400 comprising a housing 500 including a first end 501 and a second end 502 spaced from the first end 501. The enclosure 400 further includes a first end cap 600 coupleable to the first end 501 of the housing 500. The housing 500 and first end cap 600 cooperatively house, support, and cool the various components of the electrical machine 200. Some aspects can include a second end cap 602 coupleable to the second end 502 of the housing 500. It will be appreciated that in various aspects, during assembly of the electrical machine 200, the various components of the electrical machine 200 (e.g., a rotor 350, a stator (not shown), etc.) can be installed into the housing 500, and the first end cap 600 can then be coupled to the housing 500 to thereby define the enclosure 400 and enclose and retain the components within the enclosure 400.

While reference is made herein to various components of the electric machine 200, for example, a rotor 350 and a stator 250 housed within enclosure 400, aspects are not so limited, and any desired number or type of various conventional electric components can be installed and housed within aspects of the enclosure 400. It will be appreciated that such components are known by those of skill in the art, and descriptions of such components would be extensive and are beyond the scope of this disclosure. Accordingly, the disclosure herein is directed to aspects of the enclosure 400, for ease of description and understanding, and the components to be housed therein will not be described further.

As will be described in more detail herein, additional aspects of the present disclosure can be included wherein the housing 500 comprises a first integrally formed coolant channel. Other aspects described herein additionally include the first end cap 600 comprising a second integrally formed coolant channel. In some aspects, the first and second integrally formed coolant channels can be coupled in fluid communication and thus can cooperatively define a single continuous channel for a fluid coolant (designated herein as "F", and indicated in certain Figures by an arrow, designated "F") to flow therethrough.

Figure 2:
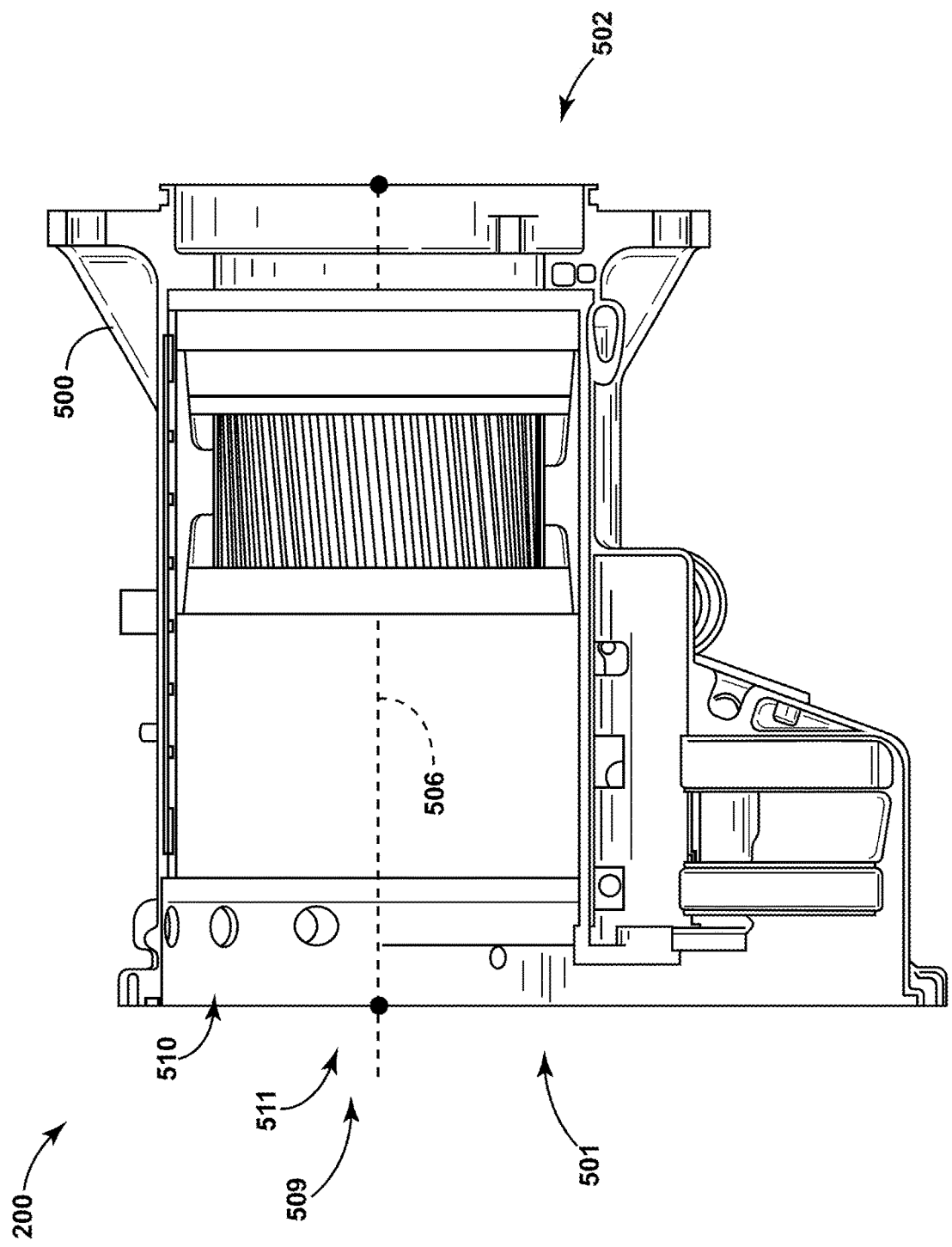
FIG. 2 illustrates a perspective view of a housing of an enclosure in accordance with various aspects described herein.

FIG. 2 depicts a perspective view of the housing 500 printed according to example aspects of the present disclosure with some parts omitted or obscured for ease of explanation and understanding. The housing 500 can define a first axial bore 510 such as a cavity therein. The first axial bore 510 can comprise a first end 509. In example aspects, the housing 500 can be printed layer-by-layer perpendicular to a centerline 506 through the first axial bore 510. The housing 500 can be printed to define the first axial bore 510 having an opening 511 at the first end 509 of the first axial bore 510. In an aspect, the first axial bore 510 can define the opening 511 at a first end 501 of the housing 500. The first axial bore 510 is configured to receive and house various components of the electrical machine 200, such as one or more stators, one or more rotors, current transformers (CTs), (not shown) rotating rectifiers (not shown), etc. In some aspects, the first axial bore 510 is open at a first end 501 of the housing 500. In other aspects, the first axial bore 510 can be open at both the first end 501 and the second end 502 of the housing 500, the second end 502 being spaced from the first end 501. In an aspect, the housing 500 first end 501 and second end 502 are at distal or opposing ends of the housing 500.

Figure 3:
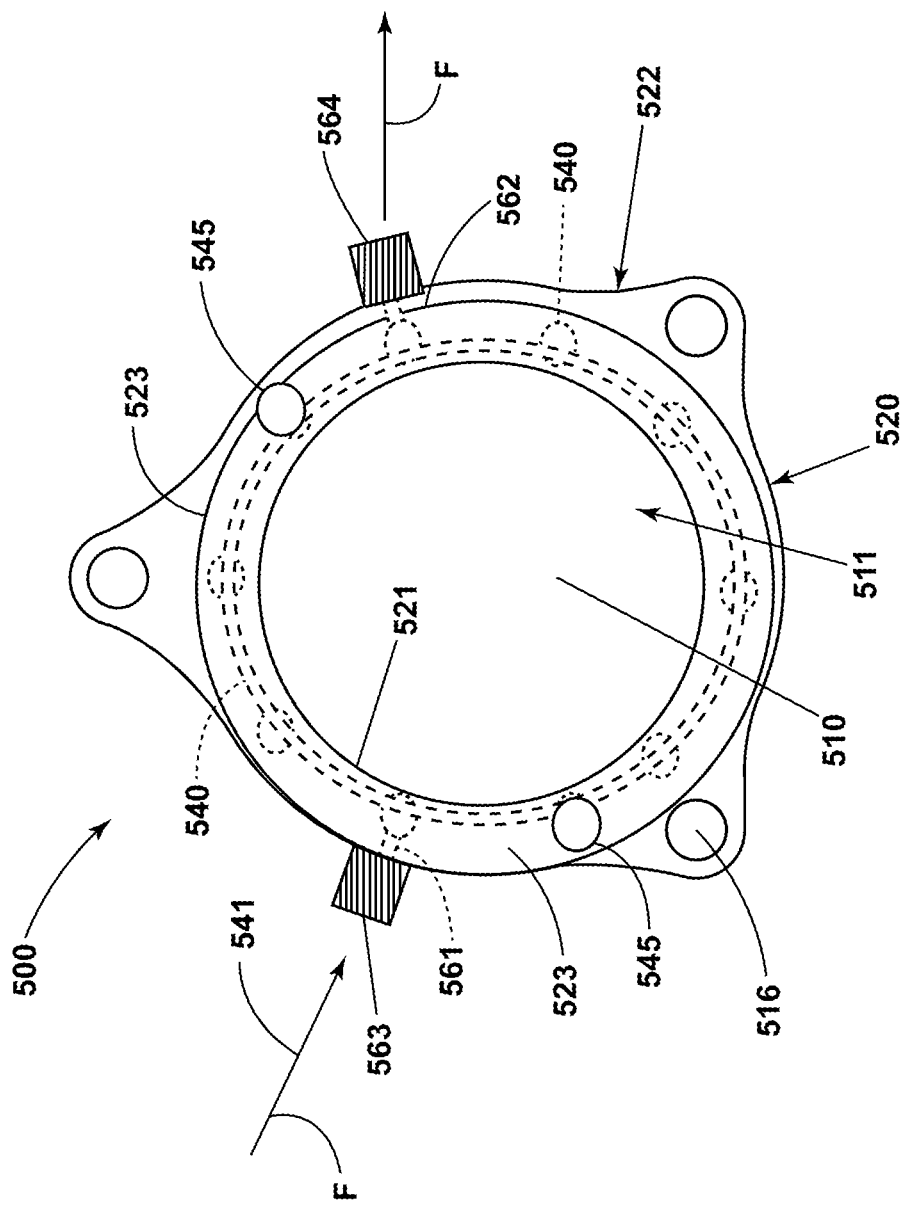
FIG. 3 is an example end view in cross-section of another housing of an enclosure in accordance with various aspects described herein.

With reference to FIG. 3, another non-limiting aspect of housing 500 is shown in an end-view orientation (that is looking into the first end 501 of housing 500) with some parts omitted or obscured for ease of explanation and understanding. The opening 511 at the first end 509 of the first axial bore 510 can be sized to facilitate insertion of various parts (such as the rotor and stator) of the electrical machine 200 during assembly of the electrical machine 200.

The housing 500 can include a first wall 520, such as a perimeter wall, comprising an axially-extending first inboard surface 521 and an axially-extending opposing first outboard surface 522. The housing 500 can further comprise a second outboard surface 523. The first wall 520 of the housing 500 can define an integral first coolant channel 540 therein, between the first inboard surface 521 and the first outboard surfaces 522. The first coolant channel 540 can provide a first flow path for the fluid coolant F to flow therethrough. Additionally, in some aspects, the second outboard surface 523 can define a set of first interface apertures 545 in fluid communication with the first coolant channel 540.

The first inboard surface 521 of the first wall 520 of housing 500 can at least partially define the first axial bore 510. The first outboard surface 522 (e.g., the outer surface of the housing 500) is opposingly spaced from the first inboard surface 521. In an aspect, the first outboard surface 522 is an exterior surface of the housing 500. In a non-limiting aspect, the first coolant channel 540 can extend and between the first inboard 521 and first outboard surface 522.

The first wall 520 can further define the second outboard surface 523. For example, the second outboard surface 523 may comprise a portion of the first outboard surface 521. In an aspect, the second outboard surface 523 can be radially extending. In some aspects, the second outboard surface 523 can be disposed to surround the opening 511 defined at the first end 509 of the first axial bore 510. In a non-limiting aspect, the second outboard surface 523 can be arranged orthogonal to the first outboard surface 522. In other aspects, the second outboard surface 523 can be arranged parallel to the first outboard surface 522.

Additionally, in a non-limiting aspect, the second outboard surface 523 can further define the set of first interface apertures 545. In such aspects, each first interface aperture 545 is arranged in fluid communication (e.g. coolant flow) with the first coolant channel 540

In some aspects, the second outboard surface 523 can also define a first set of apertures 516 sized and disposed to receive a respective fastener, such as a threaded fastener, therethrough. The fasteners can be used, for example, to selectively secure the first end cap 600 to the housing 500. In a non-limiting aspect, the first set of apertures 516 can comprise threaded apertures.

In non-limiting aspects, the first wall 520 can further define an optional inlet aperture 561 defined therethrough in fluid communication with the first coolant channel 540. Additionally, in aspects, the first wall 520 can include an optional outlet aperture 562 defined therethrough in fluid communication with the first coolant channel 540.

In operation, the fluid coolant F can enter the first coolant channel 540 by way of the inlet aperture 561. For example, a pump (not shown) can force a coolant fluid through a first hose (not shown) that is coupled to a first fitting 563 coupled in fluid communication with the inlet aperture 561. The fluid coolant F can then travel or flow through the first coolant channel 540 until it reaches the outlet aperture 562 whereby it exits the first coolant channel 540 by flowing out of the outlet aperture 562. For example, the fluid coolant F, under pressure from the pump (not shown) can be forced out of outlet aperture 562, and into a second hose (not shown) coupled to a second fitting 564 that is in fluid communication with outlet aperture 562. The second hose can deliver the fluid coolant F to a sump portion 490 or receptacle (not shown) wherein it can be recycled by the pump (not shown) back to the inlet aperture 561 to repeat the process. While the fluid coolant F travels or flows through first coolant channel 540, it absorbs heat from the stator (not shown) disposed in the first axial bore 510.

Figure 7:
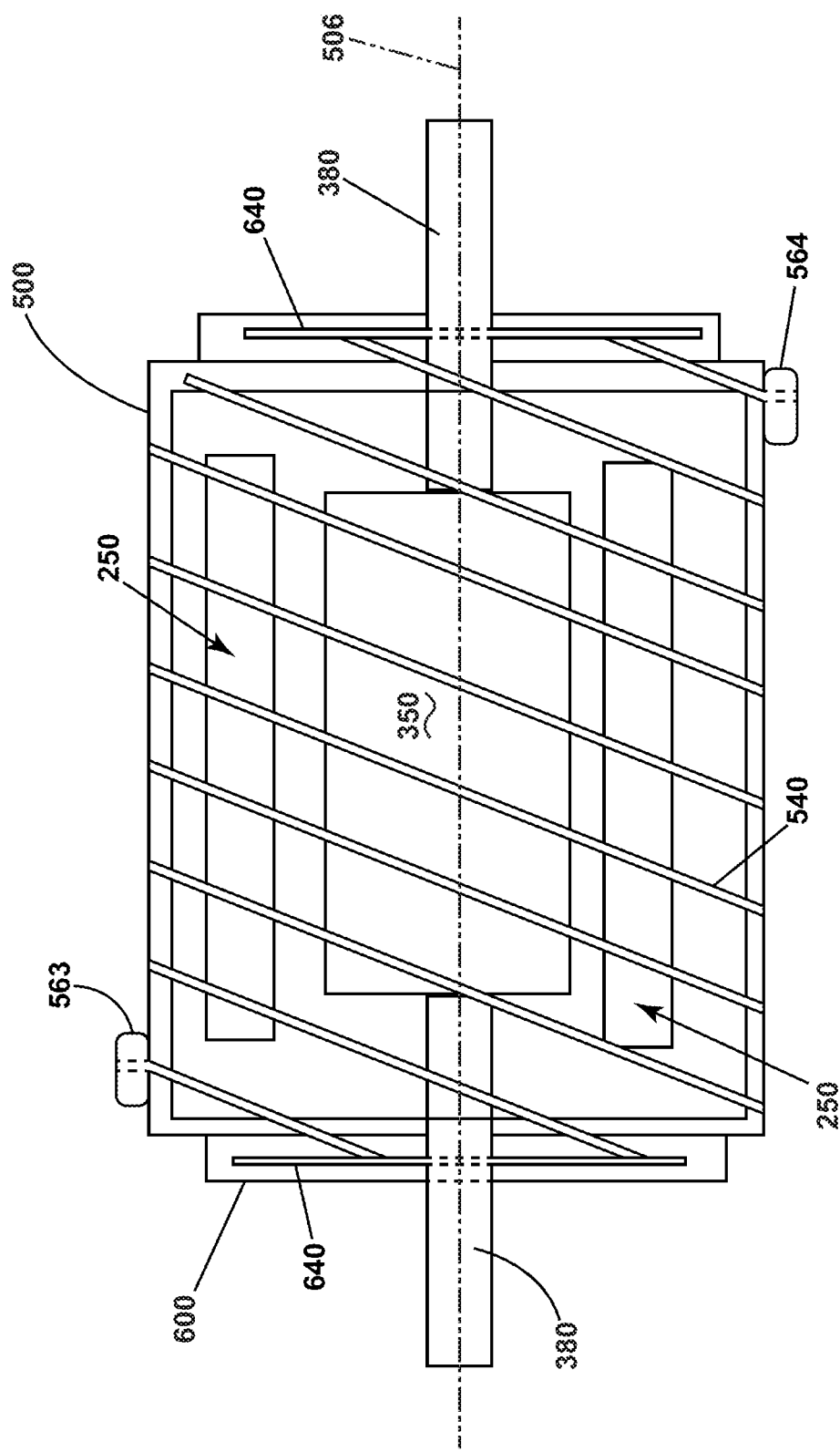
FIG. 7 is an example side view in cross-section of a housing of another enclosure with some parts omitted for clarity in accordance with various aspects described herein.

In some aspects, the first coolant channel 540 can extend helically (i.e., such that the fluid coolant F can travel helically through the first coolant channel 540. In other aspects, the first coolant channel 540 can extend axially (i.e., such that the fluid coolant F can travel axially through the first coolant channel 540). In other aspects, the first coolant channel 540 extend radially (i.e., such that the fluid coolant F can travel radially through the first coolant channel 540). In still other aspects, as depicted in FIG. 7, the first coolant channel 540 can extend with respect to the housing 500 any of helically, axially, radially, or in any combination thereof. It will be appreciated that other aspects of the housing 500 are not so limited, and the first coolant channel 540 can be arranged to define any number or combination of orientations or coolant fluid F flow paths within the first wall 520 therethrough without departing from the scope of the disclosure. By arranging the first wall 520 of housing 500 to define an integral first coolant channel 540 to enable a coolant fluid F to flow therethrough, the need for a separate conventional cooling jacket (not shown) disposed between the housing and the stator, as well as various other components (e.g., seals) that would typically be a part of a conventional electrical machine housing is eliminated.

Figure 5:
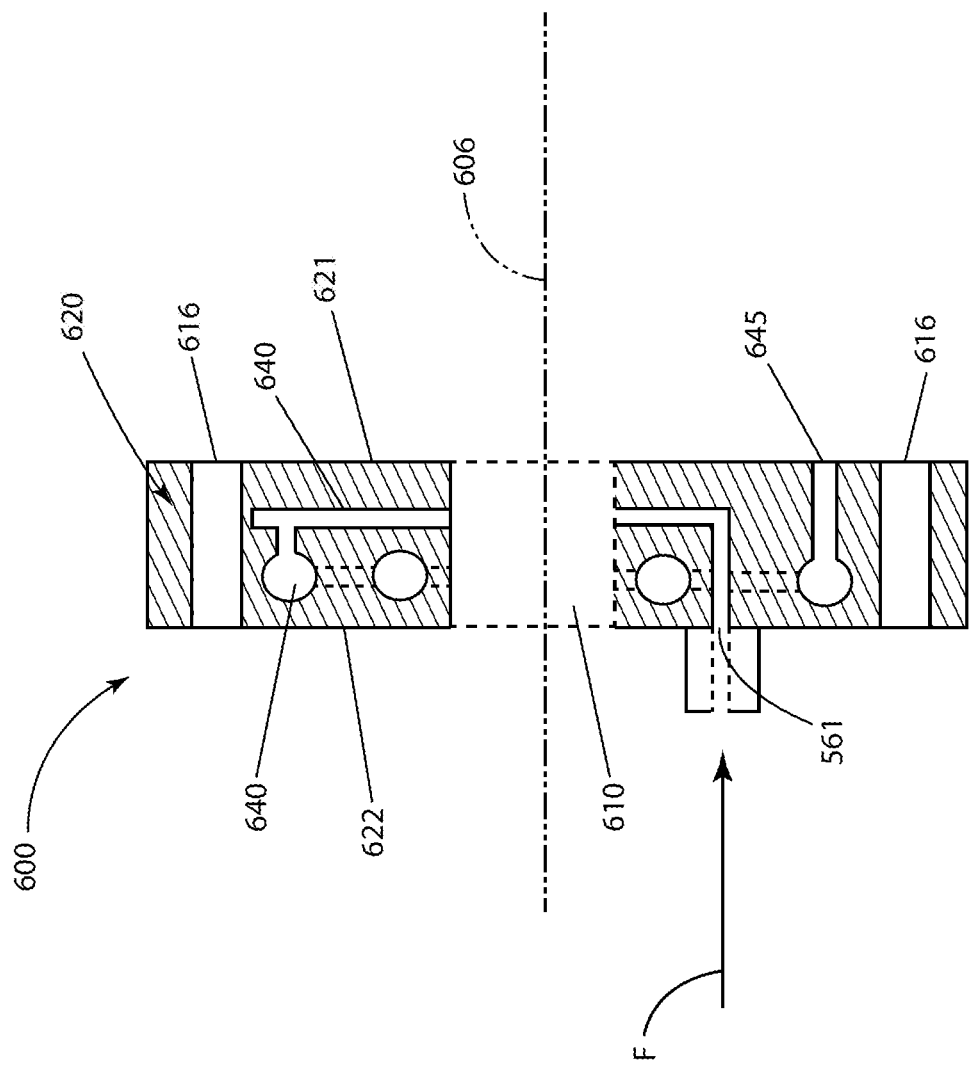
FIG. 5 is an example side view in cross-section of a housing of another first end cap in accordance with various aspects described herein.

Non-limiting aspects of the first end cap 600 and the second endcap 602 can be printed according to example aspects of the present disclosure, and descriptions of the various aspects of the first end cap 600 can apply equally to the second endcap 602. As shown in FIG. 5, with some parts omitted or obscured for ease of explanation and understanding, the first end cap 600 can optionally define a second axial bore 610 therethrough. The first end cap 600 includes a second wall 620 (for example, a perimeter wall) comprising a second inboard surface 621 and an opposing second outboard surface 622. In some non-limiting aspects, the first end cap 600 can further define an integral second coolant channel 640 therein. In an aspect, the second coolant channel 640 can be disposed between the second inboard surface 621 and the second outboard surface 622. The second coolant channel 640 can provide a second flow path for the fluid coolant F to flow therethrough. Additionally, the second inboard surface 621 can define a set of second interface apertures 645 in fluid communication with the second coolant channel 640.

The first end cap 600 can be additively manufactured to define the second axial bore 610 disposed therethrough. For example, in an aspect, the second axial bore 610 may comprise opposing open distal ends, sized to operatively receive the rotor shaft 380 rotatably therethrough. In an aspect, the first end cap 600 can be printed layer by layer perpendicular to a centerline 606 of the second axial bore 610. In other non-limiting aspects, the first endcap 600 does not include the second axial bore 610.

It will be appreciated that for ease of description and understanding, the descriptions and examples provided herein are generally directed to aspects of an enclosure 400 comprising a first endcap 600 coupled to a first end 501 of a housing 500, other aspects are not so limited. It is contemplated that other aspects may further comprise the second end cap 602 without departing from the scope of the disclosure herein. The second end cap 602 can be coupled to a second end 502 of the housing 500. In various non-limiting aspects, the second end cap 602 can be identical to the first end cap 600. In other aspects, the second endcap can comprise only some of the same features as the first end cap 600. For example, in some aspects, the first end cap 600 can include the second axial bore 610, and the second end cap can omit the second axial bore. In other aspects, both the first and second end caps 600, 602 can include a respective second axial bore 610. In still other aspects, the first and second end caps 600, 602 can both omit the second axial bore 610.

In some non-limiting aspects, the second outboard surface 523 of the housing 500 can be operatively coupled to the corresponding second inboard surface 621 (not shown) of the first end cap 600. The second inboard surface 621 of the first end cap 600 second wall 620 can be operatively arranged to face the first axial bore 510 and the second outboard surface 523 of the housing 500. The second outboard surface 622 (i.e., the outer surface of the first end cap 600) of the first end cap 600 second wall 620 is spaced from and opposing the second inboard surface 621. The second inboard surface 621 can be arranged as a radially extending surface that can be operatively coupled to the second outboard surface 523 of the housing 500. When the second inboard surface 621 is coupled to the second outboard surface 523 of the housing 500, the first end cap 600 is thereby operative to cover at least a portion of the opening 511 defined at the first end 509 of the first axial bore 510. In non-limiting aspects, when the first end cap 600 is coupled to housing 500, the first axial bore 510 and second axial bore 610 can be concentrically aligned.

Accordingly, in some aspects, the first end cap 600 can define a second set of apertures 616 sized and disposed to receive the fastener (e.g. a threaded fastener, not shown) therethrough. The second set of apertures 616 are disposed to align with corresponding apertures 516 of the first set of apertures to facilitate installation of the fasteners (not shown). The fasteners (not shown) can be used to secure the first end cap 600 to the housing 500. In a non-limiting aspect, the second set of apertures 616 comprise threaded apertures 616.

In non-limiting aspects, the first end cap 600 can be additively manufactured to define the second coolant channel 640 integrally therein. For example, in an aspect, the second wall 620 can define the second coolant channel 640 therein. In an aspect, the second coolant channel 640 can extend parallel to and between the second inboard surface 621 and second outboard surface 622.

Figure 4:
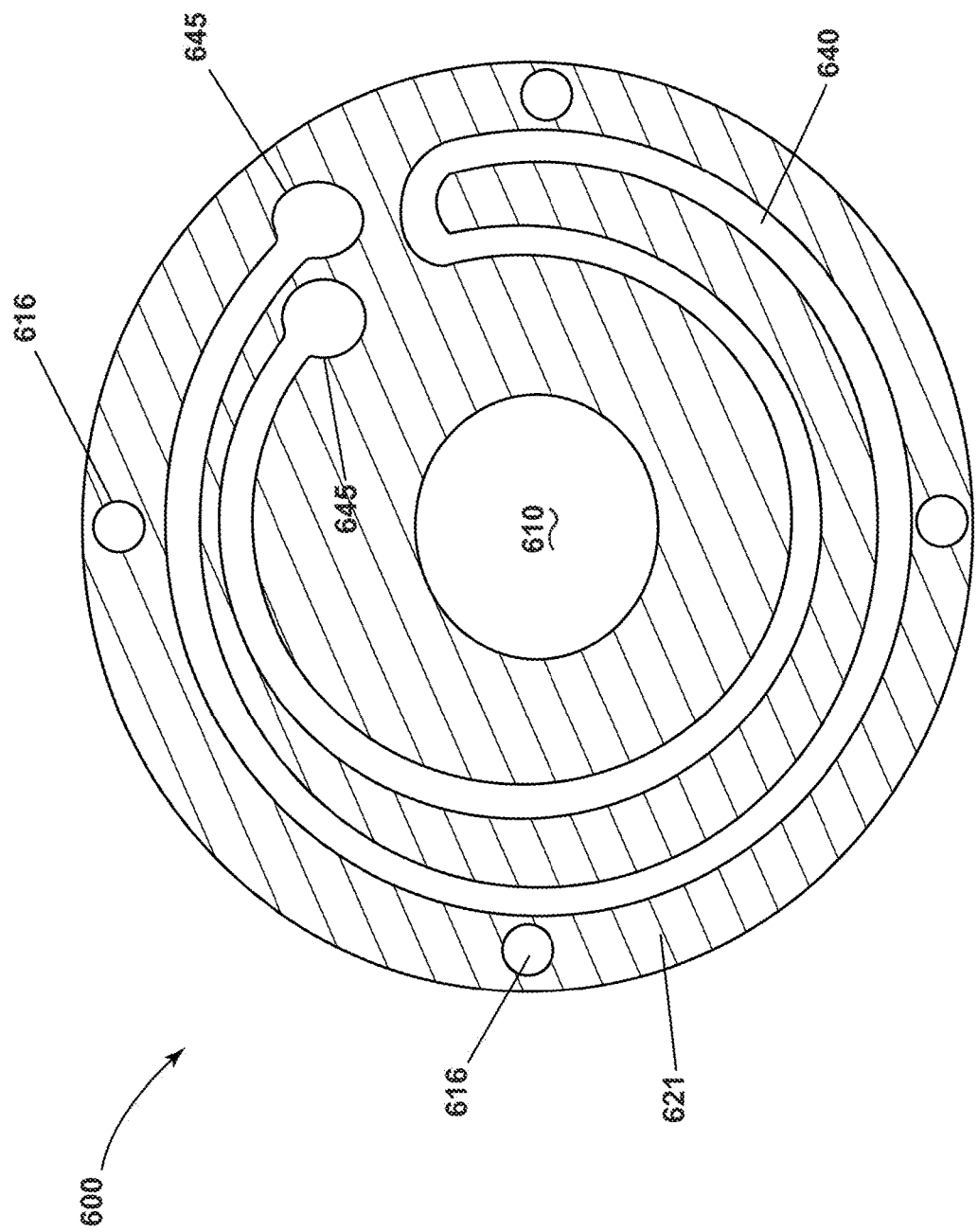
FIG. 4 is an example front view in cross-section of a first end cap of another enclosure in accordance with various aspects described herein.

In some aspects, as depicted in FIG. 4, the second coolant channel 640 extend helically (i.e., such that the fluid coolant F can travel helically through the first end cap 600 through the second coolant channel 640). In other aspects, the second coolant channel 640 can extend radially (i.e., such that the fluid coolant F can travel radially through the second coolant channel 640). In other aspects, as depicted in FIG. 5. the second coolant channel 640 extend axially (i.e., such that the fluid coolant F can travel axially through the second coolant channel 640). In still other aspects, the second coolant channel 640 can extend helically, axially, radially, and in any combination thereof. It will be appreciated that other aspects of the first end cap 600 are not so limited, and the second coolant channel 640 can be arranged to define any number or combination of orientations of coolant fluid F flow paths within the second wall 620 therethrough without departing from the scope of the disclosure.

In non-limiting aspects, the second inboard surface 621 further defines the set of second interface apertures 645 in fluid communication with the second coolant channel 640. In a non-limiting aspect, the set of first interface apertures 545 of housing 500 can be sized and disposed to operatively align with a corresponding aperture of the set of second interface apertures 645 in fluid communication second coolant channel 640 defined in the first end cap 600.

For example, each second interface aperture 645 can be sized and disposed to align with, and be in fluid communication with, a corresponding first interface aperture 545 of housing 500 to enable fluid communication (e.g., coolant flow) between the second coolant channel 640 of the first end cap 600 and the first coolant channel 540 of the housing 500. In this way, the first coolant channel 540 of the housing, and the second coolant channel 640 of the first end cap 600 can define a continuous coolant flow path that traverses through both the housing 500 and first end cap 600 and enables the fluid coolant to circulate between the housing 500 and first end cap 600. Additionally, by arranging the second wall 620 of the first end cap 600 to define an integral second coolant channel 640 in fluid communication with the first coolant channel 540, the continuous coolant flow path can be arranged to surround the electrical machine 200 thereby providing an enhanced cooling performance over a conventional cooling jacket (not shown).

In some non-limiting aspects, the second wall 620 can optionally define the inlet aperture 561 therethrough. In such aspects, the inlet aperture 561 can be disposed in fluid communication with the second coolant channel 640. Additionally, in aspects, the second wall 620 can optionally include the outlet aperture 562 defined therethrough. In such aspects, the outlet aperture 562 can be disposed in fluid communication with the second coolant channel 640.

For example, the fluid coolant F can be introduced into the second coolant channel 640 by way of the inlet aperture 561. For instance, a pump (not shown) can be used to force a fluid coolant F through a first hose (not shown) that can be coupled to the first fitting 563 coupled in fluid communication with the inlet aperture 561. The fluid coolant F can then travel or flow through the second coolant channel 640 until it reaches the outlet aperture 562 whereby it exits the second coolant channel 640 by flowing out of the outlet aperture 562. For example, the fluid coolant F, under pressure from the pump (not shown) can be forced out of outlet aperture 562, and into a second hose (not shown) coupled to a second fitting 564 that is in fluid communication with outlet aperture 562. The second hose can deliver the fluid coolant F to a sump or receptacle wherein it can be recycled by the pump (not shown) back to the inlet aperture 561 to repeat the process. While the fluid coolant F travels through second channel 640, it absorbs heat from the electrical machine 200 or components thereof disposed in the first axial bore 510 and facing the second inboard surface 621.

In some aspects, the inlet aperture 561 and outlet aperture 562 can be defined through the first wall 520 of housing 500. In other aspects, the inlet aperture 561 and outlet aperture 562 are defined through the second wall 620 of first end cap 600. In still other aspects, the inlet aperture 561 is defined through the first wall 520 of housing 500 and the outlet aperture 562 is defined through the second wall 620 of first end cap 600. In yet other aspects, the inlet aperture 561 is defined through the second wall 620 of first end cap 600, and the outlet aperture 562 is defined through the first wall 520 of housing 500.

It is contemplated that various aspects as described herein can employ a fluid coolant F. It will be understood that the fluid coolant F can be provided to the first or second coolant channels 540, 640, for example by way of the inlet aperture 561. It will be further appreciated that the fluid coolant F can operatively flow through the first and second coolant channels 540, 640. For example, in a non-limiting aspect, an external pump can be used to pump or force the fluid coolant F through the first and second coolant channels 540, 640.

Figure 6:
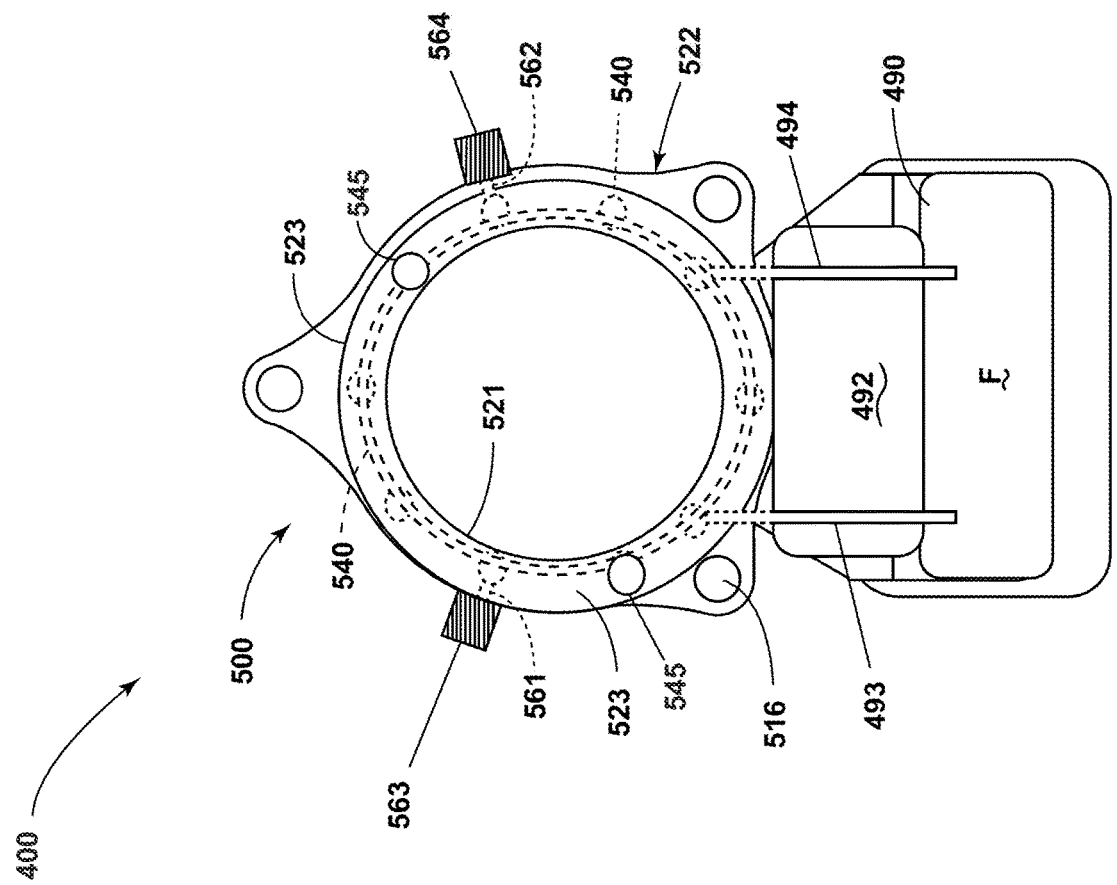
FIG. 6 is an example end view in cross-section of an electric machine with the first end cap removed for clarity, in accordance with various aspects described herein.

With reference to FIG. 6, an alternative aspect of the housing 500 is shown in accordance with various aspects described herein. The housing 500 is like the housing 500 illustrated in FIG. 2; therefore, like parts will be identified with like numerals, with it being understood that the description of the like parts of the first example housing 500 of FIG. 2 applies to the second example housing 500 of FIG. 6, unless otherwise noted. One difference is that aspects of the disclosure included in FIG. 6 can include for example, a sump portion 490.

In some aspects, the enclosure 400 may additionally define the sump portion 490 as a reservoir for the fluid coolant F. In such aspects, the sump portion can be in fluid communication with the first and second coolant channels 540, 640. In an aspect, a pump 492 (for example, a diaphragm-type pump) can be arranged to pump or force the fluid coolant F into a feed line 494 wherein the feed line 494 is coupled in fluid communication with at least one of the first and second coolant channels 540, 640. A fluid coolant F return line 493 can be coupled in fluid communication with at least one of the first and second coolant channels 540, 640 to provide a return path for the fluid coolant F to return to the sump portion 490.

It is further contemplated that the fluid coolant F can comprise, in various aspects, a liquid. In other aspects the fluid coolant can comprise a gas. In some non-limiting aspects, the fluid coolant may be pressurized. In an aspect, the fluid coolant can be pressurized above atmospheric pressure using a conventional pump 494. For example, aspects used in aviation or high-altitude applications can employ a pressurized gas as the fluid coolant F.

Once the housing 500 and first end cap 600 have been printed according to example aspects of the present disclosure, the various components can be assembled to form the electrical machine 200. For instance, a stator assembly, rotor assembly, and any other desired components (not shown) can be assembled and inserted within the housing 500 (e.g., into the first axial bore 510), and the first end cap 600 fastened thereto to form the electrical machine 200.

In an aspect, the first end cap 600 can be coupled to the housing 500 via a first pair of mounting ears (not shown) positioned at the first end 501 of the housing 501. In other aspects, a second end cap 602 can be coupled to the housing 500 via a second pair of mounting ears (not shown) positioned at a second end of 502 the housing 500. The second end 502 can be spaced apart from the first end 501 along a length of the housing 500.

When the various parts, such as stator assemblies and rotor assemblies of electric machine 200 are coupled to one another and disposed within the first axial bore 510, the first end cap 600 can, in effect, seal the various parts from an external environment.

Figure 8:
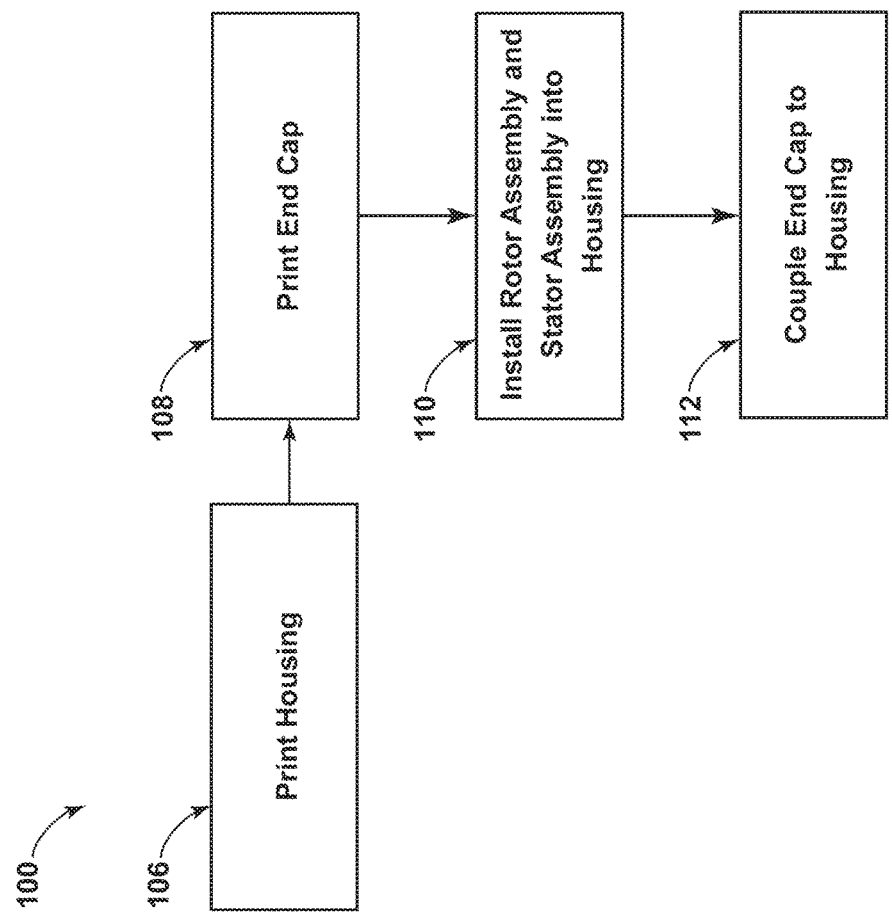
FIG. 8 illustrates an exemplary method flow diagram of a method of assembling an electric machine, in accordance with various aspects described herein.

With reference to FIG. 8, a flow diagram of a method 100 of manufacturing the electrical machine 200 according to example aspects of the present disclosure is depicted. The steps are shown in FIG. 8 as performed in a particular order for purposes of illustration and discussion. Those of ordinary skill in the art, using the disclosures provided herein, will understand that the steps of any of the methods disclosed herein can be adapted, expanded, include sub-steps, modified, omitted, performed simultaneously, or rearranged in various ways without deviating from the scope of the present disclosure.

The method 100 of manufacturing the electrical machine 200, can include fabricating the housing 500 at step 106. For example, fabricating the housing 500 can include printing the housing 500 using additive manufacturing techniques. Printing a housing 500, (i.e., at 106), can include defining a first axial bore 510 having an opening 511 at a first end 509 of the first axial bore 510. Printing the housing 500 can also include printing a first wall 520 having a first inboard surface 521 partially defining the first axial bore 510, and a first outboard surface 522 spaced from the first inboard surface 521, the first wall 520 defining a first coolant channel disposed 541 between the first inboard surface 521 and the first outboard surface 522.

The method 100 can include printing a first end cap 600 for the electrical machine 200, at 108. In aspects, fabricating the first end cap 600 at step 108 can include printing the first end cap 600 using additive manufacturing techniques. Printing the first end cap 600 (i.e., at 108), can include defining a second axial bore 610 therethrough. Printing the first end cap 600 can also include printing a second wall 620 having a second inboard surface 621, and a second outboard surface 622 spaced from the first inboard surface 521, the second wall 620 defining a second coolant channel disposed 641 between the second inboard 621 and the second outboard surface 622.

The method 100 can include installing the various components, such as a rotor assembly or a stator assembly into the housing, at 110. The method 100 can include coupling the first end cap 600 to the housing to enclose the components (i.e., the stator assembly, rotor assembly, and any other desired therein, at 112 and thereby form the electrical machine 200.

Figure 9:
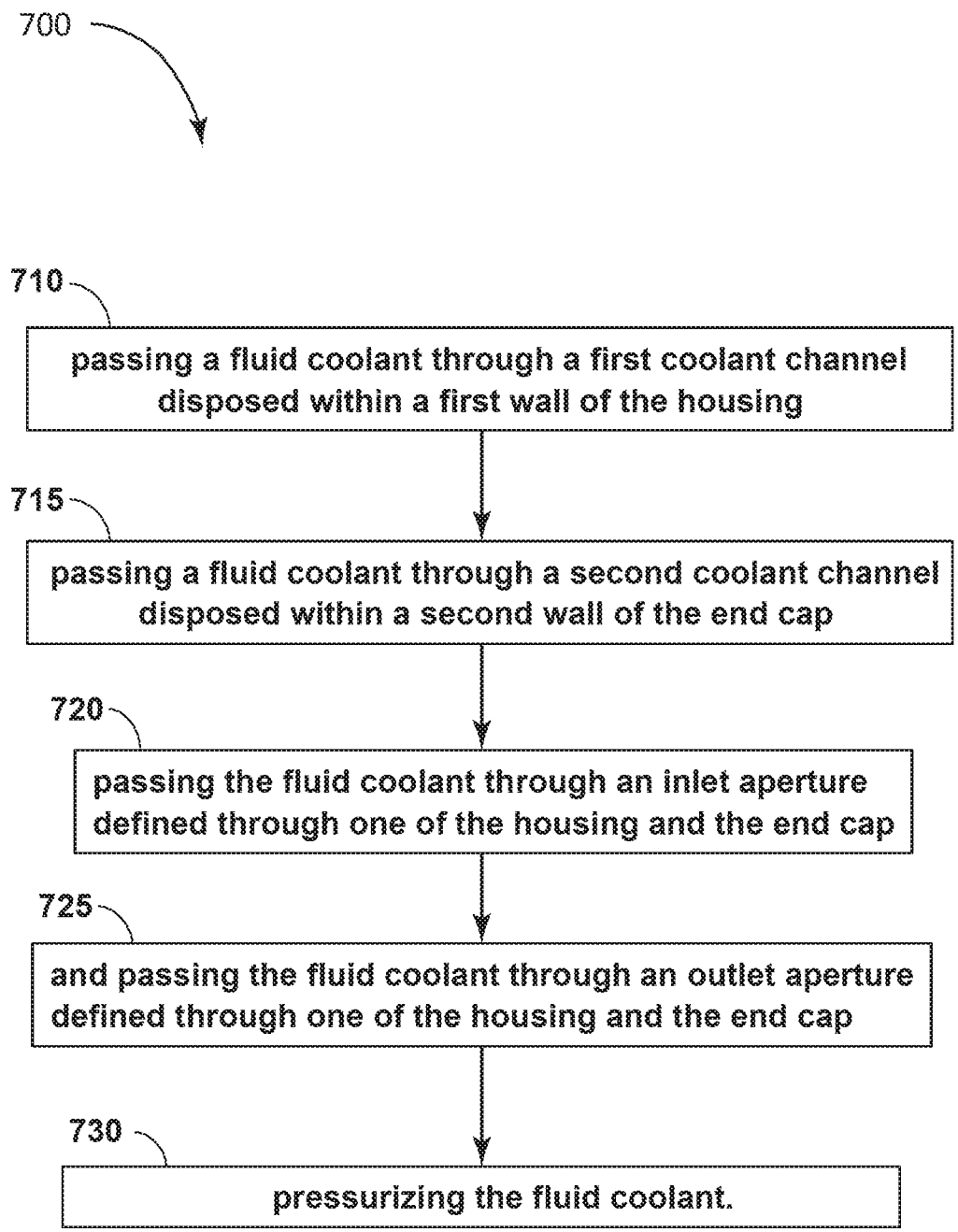
FIG. 9 illustrates an exemplary method flow diagram of a method of cooling an electric machine, in accordance with various aspects described herein.

A method 700 of cooling an electrical machine 200 enclosed by a housing 500 and a first end cap 600 is depicted in the flow diagram of FIG. 9. The sequence depicted is for illustrative purposes only and is not meant to limit the method 700 in any way as it is understood that the portions of the method can proceed in a different logical order, additional or intervening portions can be included, or described portions of the method can be divided into multiple portions, or described portions of the method can be omitted without detracting from the described method.

The method includes passing a fluid coolant F through a first coolant channel 540 disposed within a first wall 520 of the housing 500, the first wall having a first inboard surface 521 and a first outboard surface 522 spaced from the first inboard surface, wherein the first coolant channel 540 is disposed between the first inboard surface 521 and the first outboard surface 522, at 710. In an aspect, the method includes passing the fluid coolant F through a second coolant channel 640 disposed within a second wall 620 of the first end cap 600, the second wall 620 having a second inboard surface 621 and a second outboard surface 622 spaced from the second inboard surface 621, wherein the first coolant channel 640 is disposed between the second 621 inboard and second outboard surface 622, at 715. In an aspect, the first coolant channel 540 and second coolant channel 640 can be coupled in fluid communication.

Some aspects of the method 700 can further include passing the fluid coolant F through an inlet aperture 561 defined through one of the housing and the end cap, at 720; and passing the fluid coolant F through an outlet aperture 562, 662 defined through one of the housing and the end cap, at 725. In such an aspect, the inlet aperture 561 can be in fluid communication with one of the first coolant channel 540 and the second coolant channel 640, and the outlet aperture 562, 662 can be in fluid communication with one of the first coolant channel 540 and the second coolant channel 640. Still other non-limiting aspects can include pressurizing the fluid coolant F, at 730.

Many other possible aspects and configurations in addition to that shown in the above figures are contemplated by the present disclosure.

The aspects disclosed herein provide a fluid coolant circuit in a housing for an electrical machine without the need for a separate cooling jacket. One advantage that can be realized in the above aspects is that the above described aspects have superior cooling capabilities compared with conventional systems. Additionally, the above aspects eliminate the need for a separate cooling jacket disposed between the housing and the electrical components of the electrical machine.

To the extent not already described, the different features and structures of the various aspects can be used in combination with each other as desired. That one feature cannot be illustrated in all the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

The features disclosed in the foregoing description, in the following claims or in the accompanying drawings can, both separately and in any combination thereof, be material for realizing the disclosure in diverse forms thereof. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

An enclosure for an electric machine comprising: a housing defining an axial bore having an opening at a first end of the bore, the housing comprising: a first wall having a first inboard surface partially defining the bore, and a first outboard surface spaced from the first inboard surface, the first wall defining a first coolant channel disposed between the first inboard and first outboard surface; and an end cap fastenable to the housing to cover the opening.

The enclosure of the preceding clause wherein the first coolant channel defines a flow path for a fluid coolant.

The enclosure of any preceding clause wherein first coolant channel is at least one of axially extending and a helically extending.

The enclosure any preceding clause wherein the end cap comprises a second wall having a second inboard surface and a second outboard surface spaced from the second inboard surface, wherein the end cap defines a second coolant channel between the second inboard and second outboard surface.

The enclosure of any preceding clause wherein the first and second coolant channels are in fluid communication.

The enclosure of any preceding clause wherein the second coolant channel is at least one of helically extending and radially extending.

The enclosure of any preceding clause, further comprising: an inlet aperture defined through one of the housing and the end cap; an outlet aperture defined through one of the housing and the end cap; and wherein the inlet aperture is in fluid communication with one of the first coolant channel and the second coolant channel, and the outlet aperture is in fluid communication with one of the first coolant channel and the second coolant channel.

The enclosure of any preceding clause, wherein the housing further defines a sump portion therein; and wherein the sump portion is in fluid communication with the first and second coolant channels.

The enclosure any preceding clause further comprising a fluid coolant disposed in the first and second coolant channels.

The enclosure of any preceding clause wherein the fluid coolant is pressurized.

A method for cooling an electric machine enclosed by a housing and an end cap, comprising: passing a fluid coolant through a first coolant channel disposed in a first wall of the housing, the first wall having a first inboard surface and a first outboard surface spaced from the first inboard surface, wherein the first coolant channel is disposed between the first inboard and first outboard surface.

The method of any preceding clause, further comprising: passing a fluid coolant through a second coolant channel disposed in a second wall of the end cap, the second wall having a second inboard surface and a second outboard surface spaced from the second inboard surface, wherein the first coolant channel is disposed between the second inboard and second outboard surface.

The method of any preceding clause, wherein the first coolant channel and second coolant channel are in fluid communication.

The method of any preceding clause wherein the second coolant channel is at least one of helically extending and radially extending.

The method of any preceding clause further comprising an passing the fluid coolant through an inlet aperture defined through one of the housing and the end cap; and passing the fluid coolant through an outlet aperture defined through one of the housing and the end cap; wherein the inlet aperture is in fluid communication with one of the first coolant channel and the second coolant channel, and the outlet aperture is in fluid communication with one of the first coolant channel and the second coolant channel.

The method of any preceding clause further comprising pressurizing the fluid coolant.

A method of manufacturing an electric machine, comprising: printing a housing defining an axial bore having an opening at a first end of the bore, the housing comprising a first wall having a first inboard surface partially defining the bore, and a first outboard surface spaced from the first inboard surface, the first wall defining a first coolant channel disposed between the first inboard and first outboard surface; printing an end cap; installing a stator assembly and a rotor assembly within the housing bore; and fastening the end cap to the housing first end to cover the opening.

The method of any preceding clause wherein the end cap comprises a second wall having a second inboard surface and a second outboard surface spaced from the second inboard surface, and the end cap defines a second coolant channel therein extending between the second inboard and second outboard surface.

The method of any preceding clause further comprising coupling the first and second coolant channels in fluid communication.

The method of any preceding clause further comprising: defining an inlet aperture through one of the housing and the end cap; and defining an outlet aperture through one of the housing and the end cap; wherein the inlet and outlet apertures are in fluid communication with at least one of the first coolant channel and second coolant channel.

What is claimed is:

1. An enclosure for an electrical machine comprising:
   a housing defining an axial bore having an opening at a first end of the axial bore, the housing comprising:
   a first wall having a first inboard surface partially defining the bore, and a first outboard surface spaced from the first inboard surface, the first wall defining a first coolant channel disposed between the first inboard surface and the first outboard surface;
   an end cap fastenable to the housing to cover the opening, wherein the end cap comprises a second wall having a second inboard surface and a second outboard surface spaced from the second inboard surface, the end cap defining a second coolant channel disposed between the second inboard surface and the second outboard surface and in fluid communication with the first coolant channel;
   an inlet aperture defined through the end cap fluidly coupled with the second coolant channel; and
   an outlet aperture defined through the end cap fluidly coupled with the second coolant channel.

2. The enclosure of claim 1, wherein the first coolant channel and second coolant channel cooperatively define a flow path for a fluid coolant.

3. The enclosure of claim 2, wherein the first coolant channel is at least one of axially extending and helically extending.

4. The enclosure of claim 1, wherein the second coolant channel is at least one of helically extending and radially extending.

5. The enclosure of claim 1, wherein the housing further defines a sump portion therein; and
   wherein the sump portion is in fluid communication with the first coolant channel and the second coolant channel.

6. The enclosure of claim 1, further comprising a fluid coolant disposed in the first and second coolant channels.

7. The enclosure of claim 6 wherein the fluid coolant is pressurized.

8. A method of cooling an electric machine enclosed by a housing and an end cap, the method comprising:
   passing a fluid coolant through an inlet aperture defined through the end cap;
   passing a fluid coolant through a first coolant channel disposed in a first wall of the housing, the first wall having a first inboard surface and a first outboard surface spaced from the first inboard surface, wherein the first coolant channel is disposed between the first inboard surface and the first outboard surface;
   passing the fluid coolant through a second coolant channel disposed in a second wall of the end cap, the second wall having a second inboard surface and a second outboard surface spaced from the second inboard surface, wherein the second coolant channel is disposed between the second inboard surface and the second outboard surface and in fluid communication with the first coolant channel; and
   passing the fluid coolant through an outlet aperture defined through the end cap;
   wherein the inlet aperture is in fluid communication with the second coolant channel, and the outlet aperture is in fluid communication with the second coolant channel.

9. The method of claim 8, wherein the second coolant channel is at least one of helically extending and radially extending.

10. The method of claim 8, further comprising pressurizing the fluid coolant.

11. A method of manufacturing an electric machine, comprising:
    printing a housing defining an axial bore defining an opening at a first end of the housing, the housing comprising a first wall having a first inboard surface partially defining the axial bore, and a first outboard surface spaced from the first inboard surface, the first wall defining a first coolant channel disposed between the first inboard surface and the first outboard surface;
    printing an end cap, wherein the end cap comprises a second wall having a second inboard surface and a second outboard surface spaced from the second inboard surface, and the end cap defines a second coolant channel therein extending between the second inboard surface and the second outboard surface;
defining an inlet aperture through the end cap in fluid communication with the second coolant channel;
defining an outlet aperture through the end cap in fluid communication with the second coolant channel;
coupling the first and second coolant channels in fluid communication;
installing a stator assembly and a rotor assembly within the axial bore; and
fastening the end cap to the housing first end to cover the opening.

\* \* \* \* \*